United States Patent [19]

Bavoux et al.

[11] 4,253,142
[45] Feb. 24, 1981

[54] METHOD AND APPARATUS FOR SPEEDING UP THE DETERMINATION OF A MICROINSTRUCTION ADDRESS IN A DATA PROCESSING SYSTEM

[75] Inventors: Robert Bavoux, Rueil-Malmaison; Francis Lemaire; Pierre Salkazanov, both of Plaisir, all of France

[73] Assignee: Compagnie Internationale pour l'Informatique-CII Honeywell Bull, Paris, France

[21] Appl. No.: 881,693

[22] Filed: Feb. 27, 1978

[30] Foreign Application Priority Data

Mar. 18, 1977 [FR] France ............................ 77 08169

[51] Int. Cl.³ .................................................. G06F 9/32
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,518,413 | 6/1970 | Holtey | 364/200 X |
| 3,800,293 | 3/1974 | Enger et al. | 364/200 |
| 4,007,441 | 2/1977 | Faber | 364/200 |
| 4,038,643 | 7/1977 | Kim | 364/200 |
| 4,075,687 | 2/1978 | Nissen et al. | 364/200 |

Primary Examiner—Raulfe B. Zache
Attorney, Agent, or Firm—Lowe, King, Price and Becker

[57] ABSTRACT

A microinstruction address is determined in response to the content of an immediately preceding microinstruction. A data processing apparatus contains a memory for storing microinstructions at addressable locations. Testing bits are loaded into a test register while a microinstruction read from the memory is loaded into a microinstruction register. The following operations are performed in sequence:

(a) testing bits are loaded into a test register while a microinstruction from the memory is loaded into the microinstruction register;

(b) then the bits contained in the test register are tested while a branch register is loaded with a branch address derived either from the microinstruction register or from an external member at the same time the contents of an address register for the memory are incremented by one unit;

(c) then, depending on the test of the bits in the test register, the branch register or the address register is selected to fetch the microinstruction situated in the memory at the address located either in the branch register or in the address register.

17 Claims, 3 Drawing Figures

FIG: 2

METHOD AND APPARATUS FOR SPEEDING UP THE DETERMINATION OF A MICROINSTRUCTION ADDRESS IN A DATA PROCESSING SYSTEM

FIELD OF THE INVENTION

The present invention relates to data processing methods and apparatus, and more particularly to a method and apparatus wherein the address of a microinstruction following that currently being executed in a microprogram is determined in a relatively short interval of time.

BACKGROUND OF THE INVENTION

The invention may be applied particularly to the construction of control members of microprogrammed digital computers.

In known apparatus, determining the address of the next microinstruction in a sequence of microinstructions is performed in two sequential stages which involve: (1) testing a specific part of the microinstruction, then (2) selectively branching to a branch address contained in the microinstruction, or (3) incrementing the content of an address counter by one unit if the address of the next microinstruction directly follows the microinstruction currently being executed. To be more exact, the prior art requires at least three sequential orders within a microinstruction cycle to define two calculation stages. The orders require a branch register to be loaded, or an address counter to be incremented. The determination of which order is to be executed is dictated by testing one or more conditions which are stored in indicators. The order is made when the preceding microinstruction has been completely executed. The microinstruction register is loaded with a microinstruction read from memory at an address given by the branch register or the instruction counter. The indicators are loaded at the end of the microinstruction cycle. To define a microinstruction cycle it is necessary to consider the two preceding microinstruction determination stages and to allow each of these a tolerance for its duration. Irreducible tolerances for the duration of the microinstruction cycles are provided primarily for the response times of the electronic components involved in each of the two stages.

An object of the present invention is to provide a method of and apparatus for determining microinstruction addresses more rapidly than do prior art arrangements.

Another object of the invention is to provide a new and improved apparatus for and method of determining the address of the next microinstruction in a sequence of microinstructions.

BRIEF DESCRIPTION OF THE INVENTION

In accordance with the invention, the next microinstruction determining stage is restricted by a single tolerance on its duration. The duration of the stage depends on the response times of the electronic components involved in the determining stage. The method includes loading test bits into a test register and loading a microinstruction to be executed into a microinstruction register. Both of these loading operations occur at the beginning of a microinstruction cycle. Then the following operations are performed simultaneously:
(1) the bits in the test register are tested,
(2) a branch address is loaded into a branch register either from the microinstruction register or from external members, and
(3) the content of the address counter is incremented by one unit and then the memory is addressed by the contents of the branch register or by the address register, as dictated by the result of the test performed on a bit in the test register.

Apparatus according to the invention includes addressable memory means for storing microinstructions. The memory means is addressed by an addressing means including an address register and a branch register. The address and branch registers are selectively coupled to the memory means by a multiplexer that transmits the address from either the address register i.e., counter or the branch register to the memory. The multplexer is controlled by a logic control unit which compares a bit of the currently executed microinstruction, which bit is contained in the microinstruction register, with a particular bit in a test register. The bit from the test register is selected in response to a test region of the currently executed microinstruction.

The above and still further objects, features and advantages of the present invention will become apparent upon consideration of the following detailed description of one specific embodiment thereof, especially when taken in conjunction with the accompanying drawing.

DETAILED DESCRIPTION OF THE INVENTION

Figure 1:
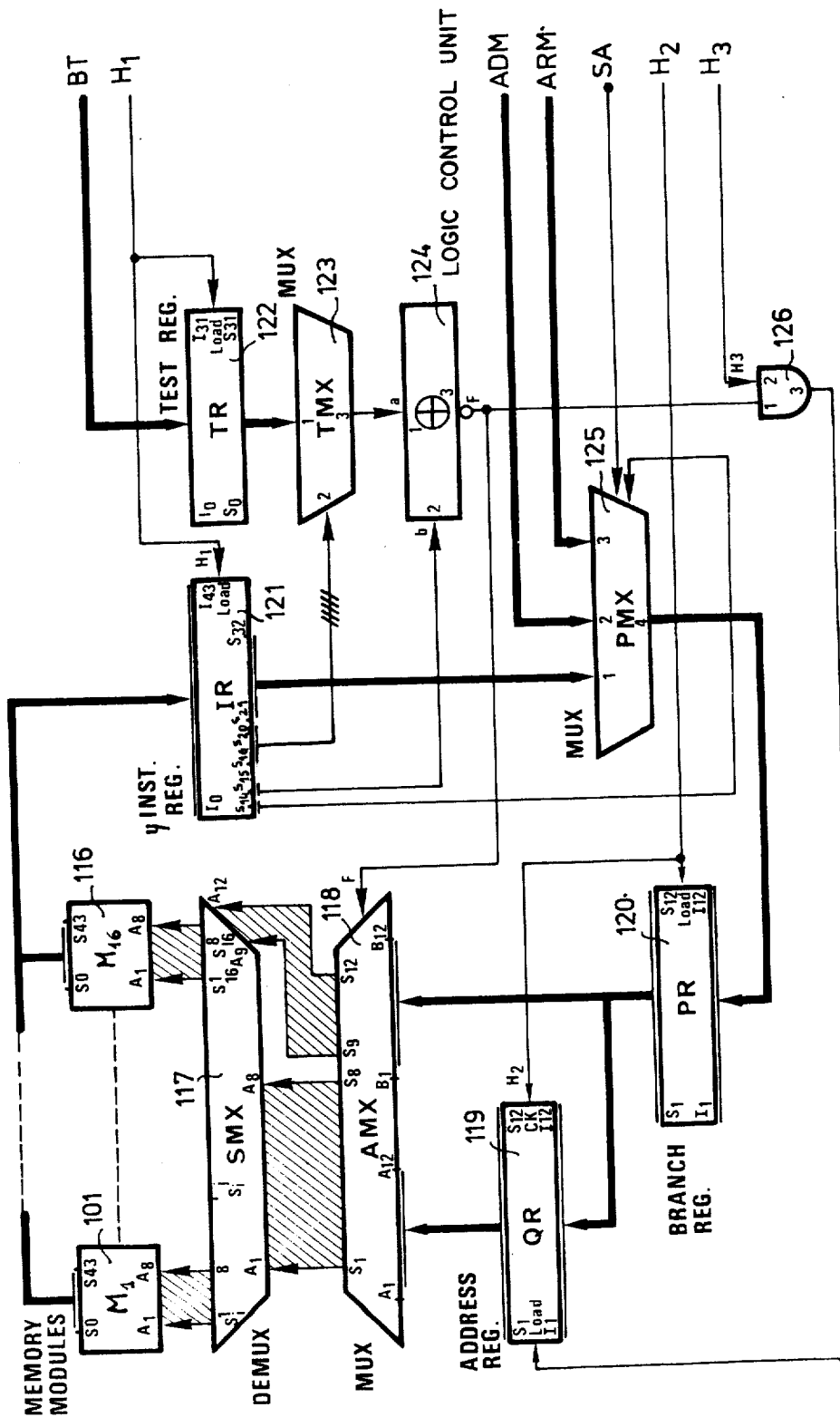
FIG. 1 is a block diagram of an embodiment of the apparatus according to the invention for speeding up address calculations.

The apparatus shown in FIG. 1 includes a set of sixteen read-only memory (ROM) modules $M_1101$–$M_{16}116$, each having an 8-bit address input and a 44-bit microinstruction word output. ROM's $M_1101$–$M_{16}116$ are selectively addressed in response to 12-bit signals in either address counter or register QR119 or branch register PR120, as coupled through addressable demultiplexer SMX117 and a multiplexer AMX118. Demultiplexer SMX117 feeds an 8-bit signal supplied to its inputs $A_1$–$A_8$ from outputs $S_1$–$S_8$ of multiplexer AMX118 to one of ROM's $M_1101$–$M_{16}116$, as designated by inputs $A_9$–$A_{12}$, as derived from outputs $S_9$–$S_{12}$ of multiplexer AMX. Multiplexer AMX feeds the signal bits $A_1$–$A_{12}$ from register QR119 to its outputs $S_1$–$S_{12}$ in response to a binary zero being supplied to its control input F; in response to a binary one being at input F, the signal bits $B_1$–$B_{12}$ from PR120 are coupled by multiplexer AMX to its $S_1$–$S_{12}$ outputs. The four most significant bits of the address operate inputs $A_9$ to $A_{12}$ of demultiplexer SMX117 in such a way as to direct the eight least significant address bits to one of the sixteen memory modules $M_1101$ to $M_{16}116$. The eight least significant bits appear at outputs $S_j$ of demultiplexer SMX117, where I represents the number of the memory module to which the output is connected and j represents the ordinal position of a bit in the address, j being between 1 and 8. Each output $S_j$ is thus connected to the corresponding input $A_j$ of a memory module $M_i$, i being between 1 and 16. The required microinstruction appears at the outputs S0 to S43 of one of the memory modules $M_1 101$ to $M_{16} 116$ and is transferred to 44-stage microinstruction register IR121. In a preferred embodiment of the invention, each memory module $M_1 101$-$M_{16} 116$ is formed by an assembly of eleven programmable read-only memories containing 256 four-bit words which are addressable by eight address bits. To produce the arrangement of the invention, it is possible to use PROM memories of the MC10149 type marketed by Motorola. The memory capacity so produced with sixteen modules is thus 4096 words of 44 bits. The apparatus of FIG. 1 also includes a 32-bit test register TR122, one of whose 32 outputs is selectively multiplexed through a multiplexer TMX123 in response to output bits $S_{16}$-$S_{20}$ of register IR121, a logic unit 124 for controlling the F input of multiplexer AMX118, and a multiplexer PMX125 that loads one of these different 12-bit words from three different sources into register PR120.

In the illustrated apparatus, the microinstruction address for one of the read-only memories $M_1 101$-$M_{16} 116$ may originate from two different sources. In the first case, the address may come from address counter QR119, which contains the currently executed microinstruction address incremented by one unit. In the second case, the address may come from branch register PR120 which contains the branch address.

Loading of branch register PR120 may take place from three sources, viz: the microinstruction register IR121 or from two sources external to the described apparatus. The two external sources may be in a logic arithmetic unit (not shown) which derives either the beginning address of a microprogram (ADM) or an address where a microprogram is to be resumed (ARM). Each of these three sources may be selected by multiplexer PMX125 under the control of the selection bit which is supplied to line SA from an outside source and a selecting bit, such as bit 14 of a microinstruction contained in register IR121. If the address of the next microinstruction is derived from microinstruction register IR121, the address is indicated by 12 outputs bits derived from a series of flip-flops $S_{21}$-$S_{32}$ of register IR121. The 12 output bits of flip-flops $S_{21}$-$S_{32}$ are simultaneously supplied via a bus to input 1 of multiplexer PMX125. The 12-bit first address ADM of a microprogram is applied to input 2 of multiplexer PMX125, while the 12-bit microprogram resumption address is applied to input 3 of multiplexer PMX125. One of the addresses supplied to multiplexer PMX125 is supplied to branch register PR120 from output 4 of multiplexer PMX125 under the control of selection bit SA derived from an external source and a bit from flip-flop $S_{14}$ of register IR121.

Thirty-two test bits are supplied by line BT to test register TR122. The 32 test bits are derived from internal sources of a central processing unit (CPU) (not shown) or from conditions external to the CPU, as reported, for example, by indicators which indicate the states of input/output channels. The bits from the CPU may represent any of: (1) indicators for the state of an output of an arithmetic logic unit, (2) an end of memory access indicator, (3) a priority level indicator, or (4) a page follow-on indicator, etc. The tested condition is selected by applying bits 16 to 20 of the microinstruction, as stored in flip-flops 16 to 20 of register IR121, to input 2 of multiplexer TMX123. The significance of the test to be performed is determined by the binary state of bit 15 of the microinstruction, as stored in flip-flop 15 of register IR121. A branch is executed if the bit from thirty-two bit register TR122 which is selected to be tested is equal to bit 15 of the microinstructions. If these two bits have the same binary value, logic control unit 124 causes signal F to have a binary one output that causes multiplexer AMX118 to feed the output of register PR120 to demultiplexer SMX117; if the bits differ, unit 124 causes the signal to be a binary zero so the output of address register QR119 is fed through multiplexer AMX118 to demultiplexer SMX117.

Signal F, generated from output 3 of the logic control unit 124, has a binary one value when bit 15 of the microinstruction (applied to input 2 of unit 124) and the bit to be tested (fed to input 1 of unit 124 by multiplexer TMX123) are of the same value. If bit 15 and the tested bits are respectively called a and b, signal F is derived by logic control unit 124 in accordance with the equation $F = a \cdot b + \bar{a} \cdot \bar{b}$. In this equation, the plus sign represents the logic OR operation, the sign · represents the logic AND operation and $\bar{a}$ means that signal a is complemented. In another embodiment of the invention, signal F may be generated by a comparison between the states of a plurality of bits of the microinstruction and a plurality of test bits.

Figure 2:
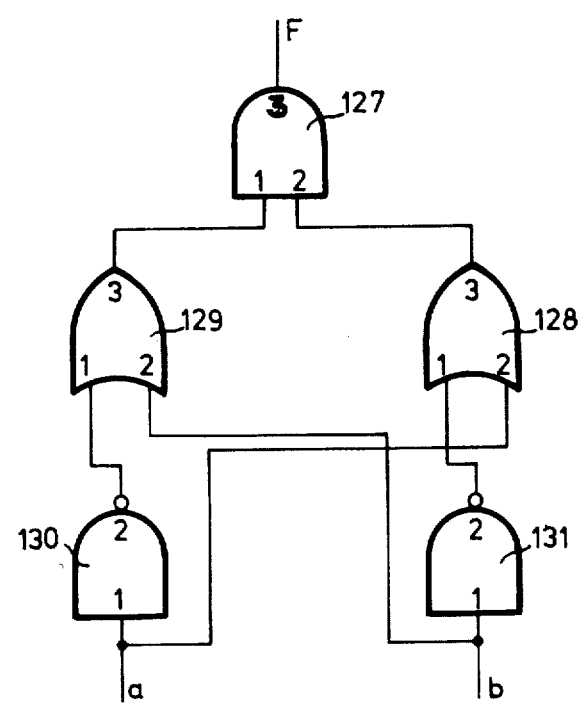
FIG. 2 is a circuit diagram of the control logic of the apparatus of FIG. 1.

FIG. 2 shows the logic circuits which form logic control unit 124. Signal a is applied to input 1 of an inverter 130 and to input 2 of an OR gate 128. Signal b is applied to input 1 of an inverter 131 and to input 2 of an OR gate 129. The signal $\bar{a}$ derived by output 2 of inverter 130 is applied to input 1 of OR gate 129 and the signal $\bar{b}$ derived by output 2 of inverter 131 is applied to input 2 of OR gate 128. The signal F is generated by output 3 of AND gate 127, having input 1 connected to output 3 of OR gate 129 and input 2 is connected to the output of OR gate 128.

Figure 3:
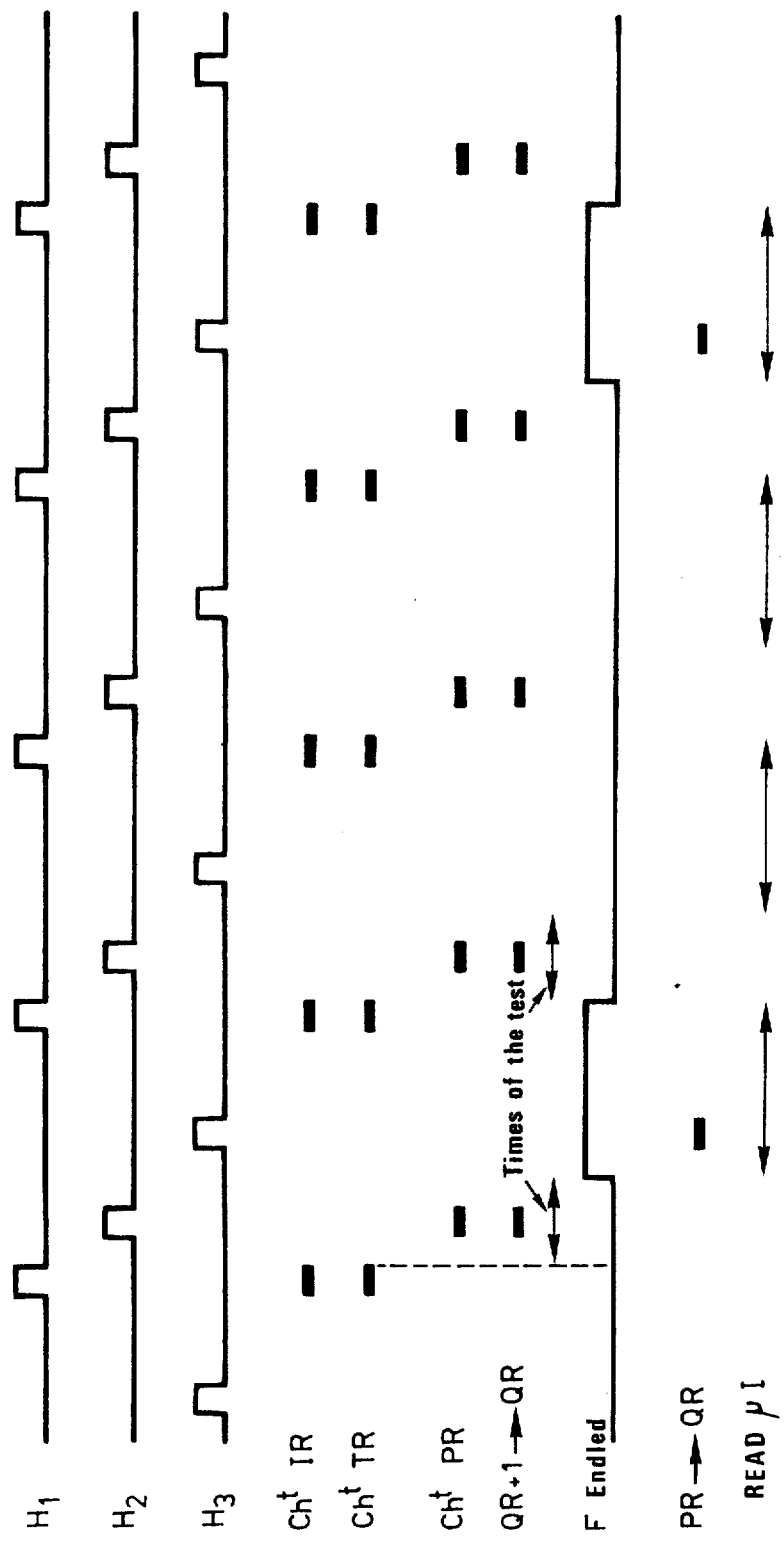
FIG. 3 is a timing diagram showing stages of the method according to the invention.

In FIG. 3 are shown timing waves as to the manner in which the operations associated with the apparatus of FIG. 1 are interrelated. The microinstruction cycle is defined by the period of a sub-clock-signal $H_1$, derived by a suitable, conventional source, not shown. The orders within the cycle are given by means of sub-clock-signals $H_1$, $H_2$ and $H_3$, that have the same frequencies but which are phase displaced by 120°. The sub-clock-signal $H_1$ is applied simultaneously to the "load" inputs of registers IR121 and TR122, thus loading the microinstruction read from memories $M_1 101$ to $M_{16} 116$ into register IR121 and the bits to be tested, present on line BT, into register TR122. The next sub-clock-signal $H_2$ is applied to the "load" input of register PR120 and to the clock input circuit of address counter 119, thus incrementing the latter by one unit.

Signal F of course is derived after registers IR and TR have been loaded, after the bit to be tested in register TR has been selected by multiplexer TMX123, and after the comparison has been made in logic control unit 124. Signal F is derived at a time dependent upon the response times of the electronic components involved. If ECL components are used, this time will be close to 40 ns. At the end of a testing period, the F bit (F = 1) appears if test bit 15, of the microinstruction contained in register IR121, and the state of the bit selected by the multiplexer TMX are the same. In this case, the required address which is derived from register PR120 is a branch, and the address counter QR119 is updated by the contents of register PR120 in response to sub-clock-signal $H_3$. Signal $H_3$ is transmitted to the "load" input of register QR119 from output 3 of AND gate 126 when the signal F derived from logic control unit 124 enables its input 1. If, after the test, signal F has a zero value when sub-clock-signal H₃ occurs, register QR119 is not loaded with the contents of register PR120, because the address which has been selected in one of the memories M₁ to M₁₆ is that contained in register QR119. The cycle which has just been described is naturally repeated during the next microinstruction cycle.

Hence, the loading of register PR, the incrementing of register QR by one unit and the testing of the test bits as dictated by the test region of the microinstruction take place in parallel. Thus, in the apparatus and method of the invention, only a single stage is required to determine the address of a microinstruction. The tolerance which has to be allowed for the microinstruction search thus depends only on the response times of multiplexer AMX118 and multiplexer TMX123 associated with logic control unit 124. No tolerance has to be allowed for the time taken to load register PR and counter QR since the actions associated with them take place within the test period and within the period taken to generate bit F. Thus, in the apparatus described, one stage is actually eliminated. In addition, the tolerances associated with generating the microinstruction address are eliminated, whereby the microinstruction cycle is shortened in comparison with that set by prior art arrangements.

All the functional requirements of the arrangement which have just been described may be met using components which one skilled in the art is able to select from a Motorola handbook entitled "MECL Integrated Circuits Data Book", third edition, September 1973.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A method of determining a microinstruction address in response to the address and content of an immediately preceding microinstruction, said method being performed with a data processing apparatus containing memory means for storing microinstructions at addressable locations, comprising the steps of:
   (a) simultaneously loading:
      (i) testing bits into a test register, and
      (ii) a microinstruction from the memory means into a microinstruction register,
   (b) then simultaneously:
      (i) testing the bits contained in the test register,
      (ii) loading a branch register with a branch address derived either from the microinstruction register or from an external member,
      (iii) incrementing the contents of an address register for the memory means by one unit,
   (c) then, depending on the test of the bits in the test register, selecting the branch register or the address register and fetching the microinstruction situated in the memory address at the address located either in the branch register or the address register, depending upon which is selected.

2. The method of claim 1 further comprising addressing the memory in response to the branch address contained in the branch register and reinitializing the address register using the address contained in the branch register in response to the test on the bits in the test register indicating a branch.

3. The method of claim 2 wherein the memory is addressed by the address contained in the address register in response to the test on the bits in the test register indicating there is to be no branch.

4. The method of claim 1 wherein the memory is addressed by the address contained in the address register in response to the test on the bits in the test register indicating there is to be no branch.

5. The method of claim 1 wherein one of the test bits in the test register is selected for testing in response to a predetermined portion of the microinstruction loaded into the microinstruction register.

6. The method of claim 5 wherein the test is performed by comparing the selected bit with a predetermined bit of the microinstruction loaded into the microinstruction register.

7. Apparatus for determining the address of a next microinstruction in a data-processing apparatus, the address determination being performed on the basis of the address and content of the immediately preceding microinstruction, comprising memory means for storing the microinstructions at addressable locations, an address register for storing addresses of the memory means, a branch register for storing addresses of the memory, a microinstruction register for storing the microinstruction read from an addressed location of the memory means, a test register for storing test bits, means for selectively coupling addresses contained by either the address register or the branch register to address inputs of the memory means, a logic control unit for controlling the selecting means in response to the value of at least one bit of a microinstruction contained in the microinstruction register and at least one test bit in the test register, the selected test bit being determined by a particular region of the microinstruction contained in the microinstruction register, said means for selectively coupling including means for simultaneously loading:
   (i) testing bits into the test register, and
   (ii) a microinstruction from the memory means into the microinstruction register; and means for thereafter simultaneously:
   (i) testing the bits contained in the test register,
   (ii) loading the branch register with a branch address derived either from the microinstruction register or from an external member, and
   (iii) incrementing the contents of the address register for the memory means by one unit, and means for selecting the branch register or the address register in response to a test carried out on the bits contained in the test register for fetching from the memory means the microinstruction situated at the address located either in the branch register or in the address register, depending upon which is selected, as the address for the microinstruction to be read from the memory means, whereby the microinstruction situated at the selected address is supplied from the memory means to the microinstruction register.

8. The apparatus of claim 7 wherein the selecting means comprises a multiplexer.

9. The apparatus of claim 8 wherein outputs of the branch register are connected in parallel to inputs of the address register and to inputs of a first channel of a two-channel multiplexer, inputs of a second channel of the two-channel multiplexer being connected to outputs of the address register.

10. The apparatus of claim 9 further including means for controlling the two channel multiplexers in response to a control signal derived from the logic control unit in response to said test bits and a test bit contained in the microinstruction having the same value.

11. The apparatus of claim 7 wherein outputs of the branch register are connected in parallel to inputs of the address register and to inputs of a first channel of a two-channel multiplexer, inputs of a second channel of the two-channel multiplexer being connected to outputs of the address register.

12. The apparatus of claim 11 further including means for controlling the two channel multiplexers in response to a control signal derived from the logic control unit in response to said test bits and a test bit contained in the microinstruction having the same value.

13. The apparatus of claim 7 wherein the selecting means comprises a two channel multiplexer and further including means for controlling the two channel multiplexers in response to a control signal derived from the logic control unit in response to said test bits and a test bit contained in the microinstruction having the same value.

14. Apparatus for determining a microinstruction address in response to the address and content of a immediately preceding microinstruction, comprising:
   memory means for storing microinstructions at addressable locations,
   an address register for storing addresses of the memory means,
   a branch register for storing addresses of the memory means,
   a microinstruction register for storing the microinstruction read from an addressed location of the memory means,
   a test register for storing test bits,
   means for simultaneously loading:
      (i) testing bits into the test register, and
      (ii) a microinstruction from the memory means into the microinstruction register,
   means for thereafter simultaneously:
      (i) testing the bits contained in the test register,
      (ii) loading the branch register with a branch address derived either from the microinstruction register or from an external member, and
      (iii) incrementing the contents of the address register for the memory means by one unit, and
   means for selecting the branch register or the address register in response to a test carried out on the bits contained in the test register for fetching from the memory means the microinstruction situated at the address located either in the branch register or in the address register, depending upon which is selected, as the address for the microinstruction to be read from the memory means, whereby the microinstruction situated at the selected address is supplied from the memory means to the microinstruction register.

15. The apparatus of claim 14 further including means for selecting one of the test bits in the test register in response to a predetermined portion of the microinstruction loaded into the microinstruction register.

16. The apparatus of claim 15 further including means for performing the test by comparing the selected bit with a predetermined bit of the microinstruction loaded into the microinstruction register.

17. The apparatus of claim 14 further including means for testing the bits in the test register, said selecting means being responsive to the testing means.

* * * * *